United States Patent
Sydon et al.

(10) Patent No.: US 8,289,950 B2
(45) Date of Patent: Oct. 16, 2012

(54) TDMA TRANSCEIVER IMPLEMENTING AT LEAST TWO INDEPENDENT RADIO STANDARDS

(75) Inventors: Uwe Sydon, Düsseldorf (DE); Henrik Wagener, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 1362 days.

(21) Appl. No.: 10/343,489

(22) PCT Filed: Jul. 18, 2001

(86) PCT No.: PCT/DE01/02681
§ 371 (c)(1),
(2), (4) Date: Jan. 31, 2003

(87) PCT Pub. No.: WO02/11307
PCT Pub. Date: Feb. 7, 2002

(65) Prior Publication Data
US 2004/0109427 A1 Jun. 10, 2004

(30) Foreign Application Priority Data
Aug. 1, 2000 (DE) .................... 100 37 469

(51) Int. Cl.
*H04L 12/66* (2006.01)
*H04B 7/212* (2006.01)

(52) U.S. Cl. ............................. 370/352; 370/337
(58) Field of Classification Search ............ 455/333, 455/326, 86, 448, 550.1, 436–444, 575.1; 375/326; 370/352, 203, 331–338
See application file for complete search history.

(56) References Cited

U.S. PATENT DOCUMENTS

| | | | |
|---|---|---|---|
| 5,930,295 A | 7/1999 | King, Jr. | |
| 6,091,963 A | 7/2000 | Mannerstraale | |
| 6,208,875 B1 * | 3/2001 | Damgaard et al. | 455/552.1 |
| 6,215,988 B1 * | 4/2001 | Matero | 455/188.1 |
| 6,275,544 B1 * | 8/2001 | Aiello et al. | 375/326 |
| 6,343,207 B1 * | 1/2002 | Hessel et al. | 455/86 |
| 6,893,347 B1 * | 5/2005 | Zilliacus et al. | 463/41 |
| 6,993,314 B2 * | 1/2006 | Lim et al. | 455/333 |
| 2002/0009983 A1 * | 1/2002 | Pritchett et al. | 455/260 |
| 2002/0058489 A1 * | 5/2002 | Schmal et al. | 455/296 |

FOREIGN PATENT DOCUMENTS

| | | |
|---|---|---|
| DE | 4344249 | 6/1995 |
| DE | 4407133 | 9/1995 |
| DE | 19818515 | 11/1999 |
| EP | 0969602 | 1/2000 |

* cited by examiner

*Primary Examiner* — Michael Faragalla
(74) *Attorney, Agent, or Firm* — Harness, Dickey & Pierce, P.L.C.

(57) ABSTRACT

A TDMA transceiver includes a baseband unit and a HF radio component part, connected by an interface. The baseband unit is independent of norms. The HF radio component part has a sequence control system which can be configured with reference to the TDMA parameters.

12 Claims, 4 Drawing Sheets

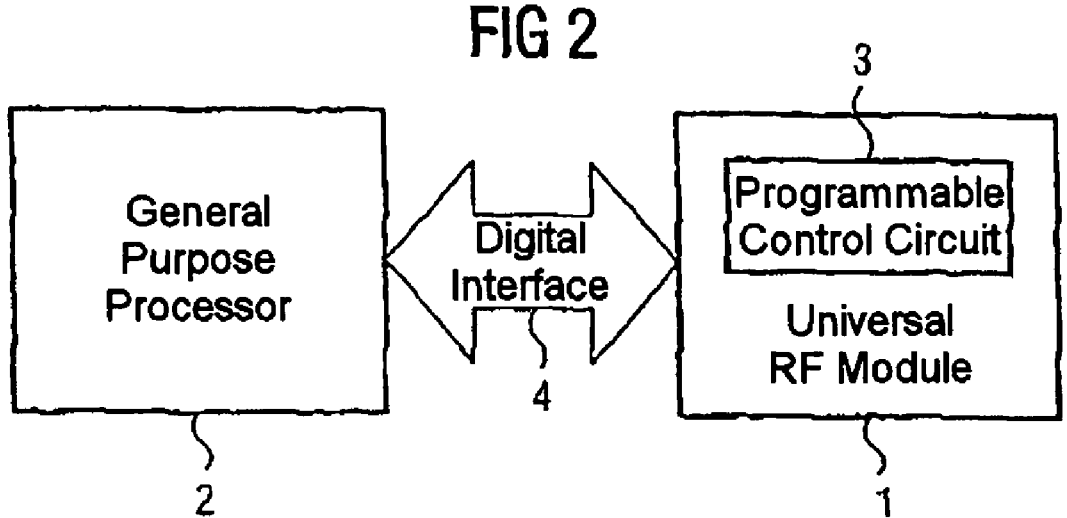
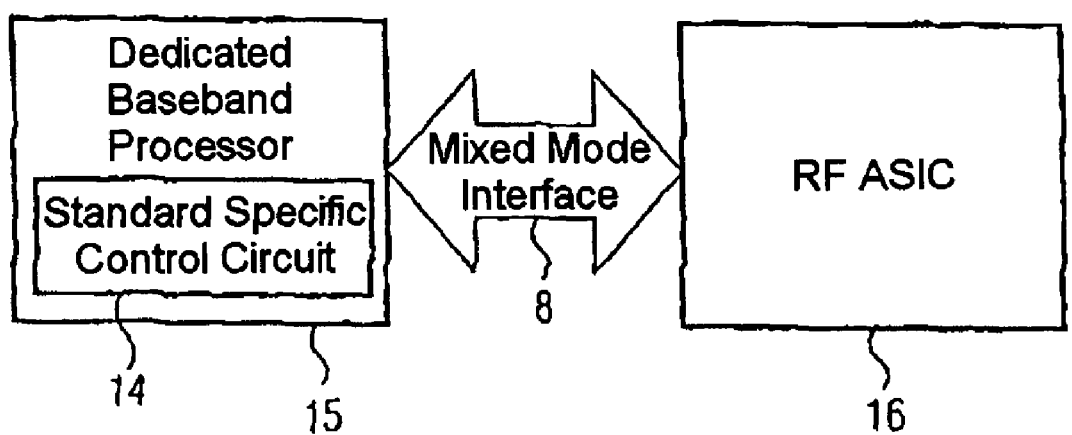

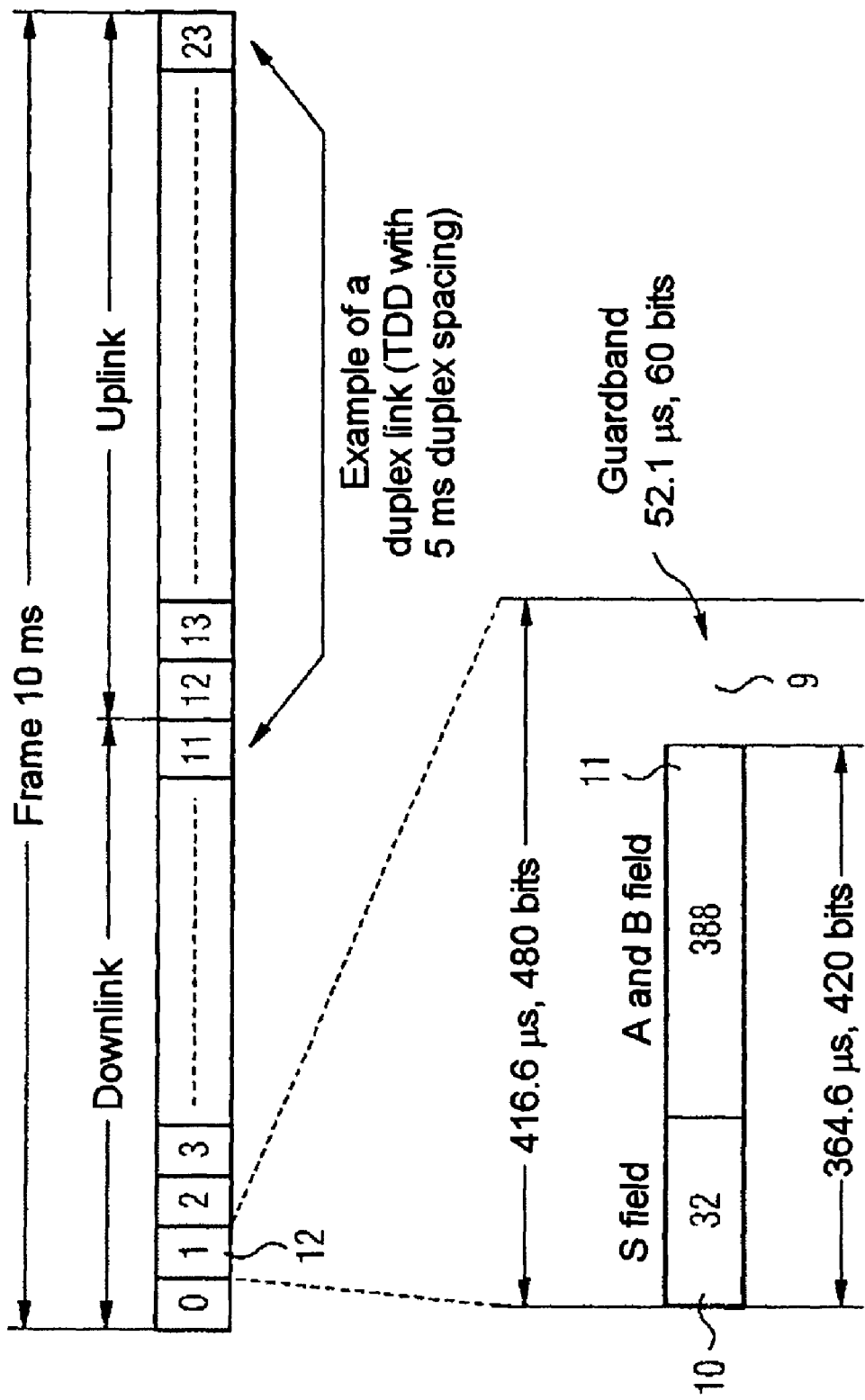

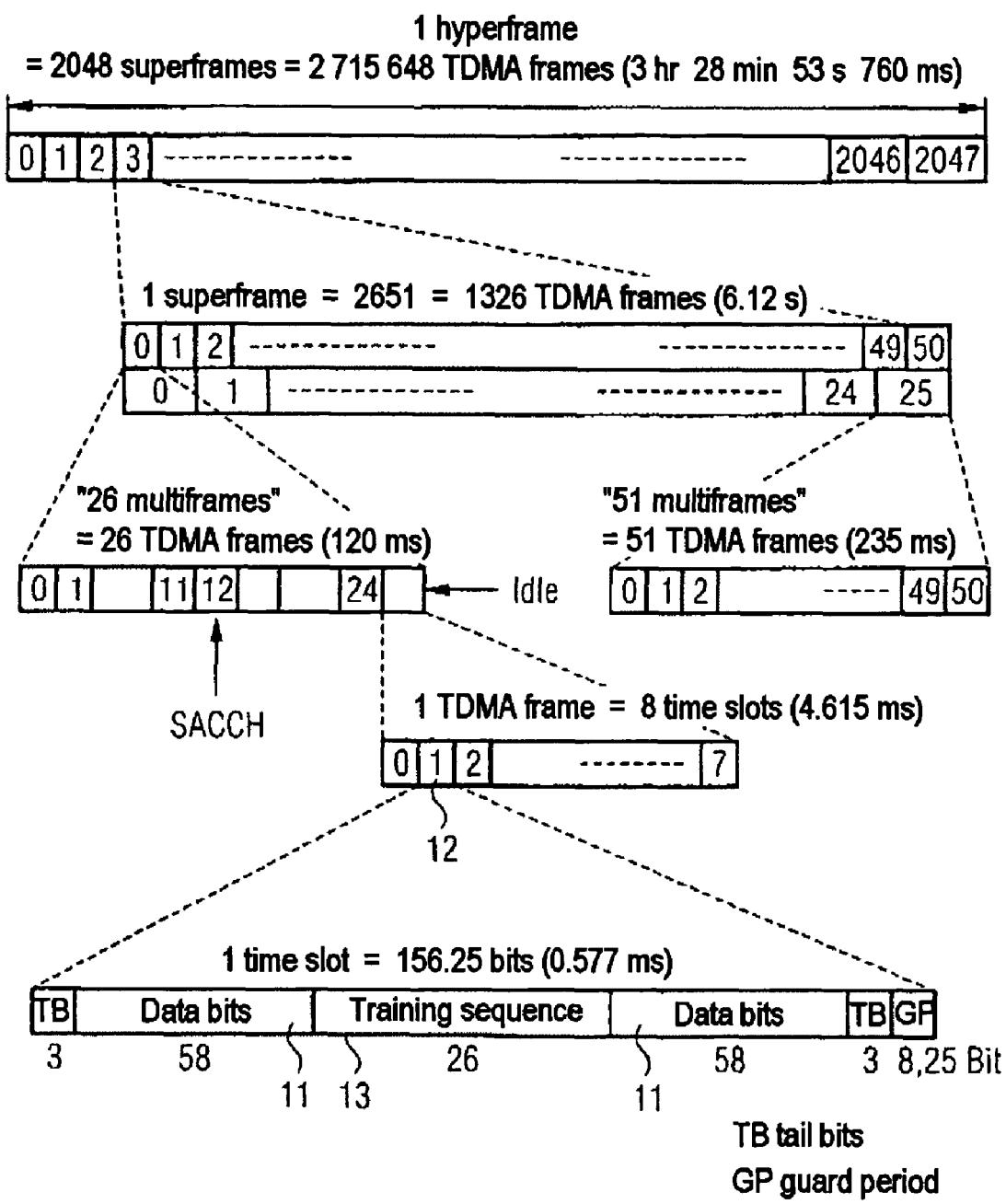

TDMA TRANSCEIVER IMPLEMENTING AT LEAST TWO INDEPENDENT RADIO STANDARDS

This application is the national phase under 35 U.S.C. §371 of PCT International Application No. PCT/DE01/02681 which has an International filing date of Jul. 18, 2001, which designated the United States of America and which claims priority on German Patent Application number DE 100 37 469.7 filed Aug. 1, 2000, the entire contents of which are hereby incorporated herein by reference.

FIELD OF THE INVENTION

The present invention generally relates to a TDMA transceiver. The invention generally relates to the use of universal radio modules in the terminals of various TDMA radio systems (e.g. GSM, DECT, Bluetooth).

BACKGROUND OF THE INVENTION

In the prior art (see FIG. 3), special burst mode controllers 14 have hitherto been used which are integrated as dedicated hard-wired logic (Standard Specific Control Circuit) in the processor of the baseband block 15. At the end of the RF radio section 16, there is an application-specific IC (RF ASIC) which is responsible for a radio transmission method according to a special standard (GSM, DECT, Bluetooth). The baseband processor 15 and the RF radio section 16 are connected to one another via a mixed-mode interface 8, that is to say via analog and digital control lines.

The burst mode controller 14 is responsible for all timing sequences in the TDMA method. It is intended to implement the special time slot output or time slot sequence of the corresponding TDMA standard. FIGS. 4 and 5 show what this looks like in the known DECT and GSM methods.

Thus, in the GSM system (FIG. 5), carrier frequencies are used which are in each case spaced apart by 200 kHz and which, in turn, are subdivided again into 8 time slots each (slots 12). In the European DECT standard, up to 10 frequency channels are used which, in turn, are subdivided into 12 time slots each for uplink and downlink. Each slot 12 is subdivided into a data field for the payload 11 and a field for synchronization and signaling purposes 10. The latter can be located directly at the start (preamble 10) or in the center (midamble 13) of the slot 12. In DECT systems (see FIG. 4), for example, a preamble 10 is used, whereas the GSM system (FIG. 5) uses a midamble 13.

So that no interference occurs between adjacent time slots, a guardband 19 of corresponding length must be provided as one of numerous timing parameters between the slots 12. Thus, the respective time slot masks of the TDMA radio systems considered require different timing parameters which are specified by the burst mode controller 14 in the prior art.

Considering the multiplicity of current and planned TDMA radio systems (GSM, DECT, Bluetooth etc.), it appears to be a meaningful task to enable components in a TDMA transmission system to be used more universally.

SUMMARY OF THE INVENTION

An embodiment of the present invention represents an attempt to use a universal standard-independent radio module in the terminals of different systems.

According to an embodiment of the invention, this object may be achieved by parts of the burst mode controller being moved into the RF radio section in the form of a sequence control which can be configured with respect to the TDMA parameters. This logic, which is also at circuit level but can be programmed from the outside, is thus included in the RF section and is independent of the baseband block.

The interface between baseband block and RF section thus becomes a purely digital interface.

The RF radio section and the sequence control can be combined to form one radio module and integrated in one chip.

Furthermore, a mobile radio device can be equipped with such a TDMA transceiver.

BRIEF DESCRIPTION OF THE DRAWINGS

Further advantages, features and characteristics of the present invention will now be explained in greater detail by means of exemplary embodiments, referring to the attached drawings, in which:

FIG. 2 also diagrammatically shows the TDMA transceiver,

FIG. 3 diagrammatically shows a TDMA transceiver according to the prior art,

FIG. 4 diagrammatically shows the TDMA time slot structure of the DECT standard, and FIG. 5 diagrammatically shows the TDMA time slot structure of the GSM standard.

DETAILED DESCRIPTION OF THE PREFERRED EMBODIMENTS

Figure 1:
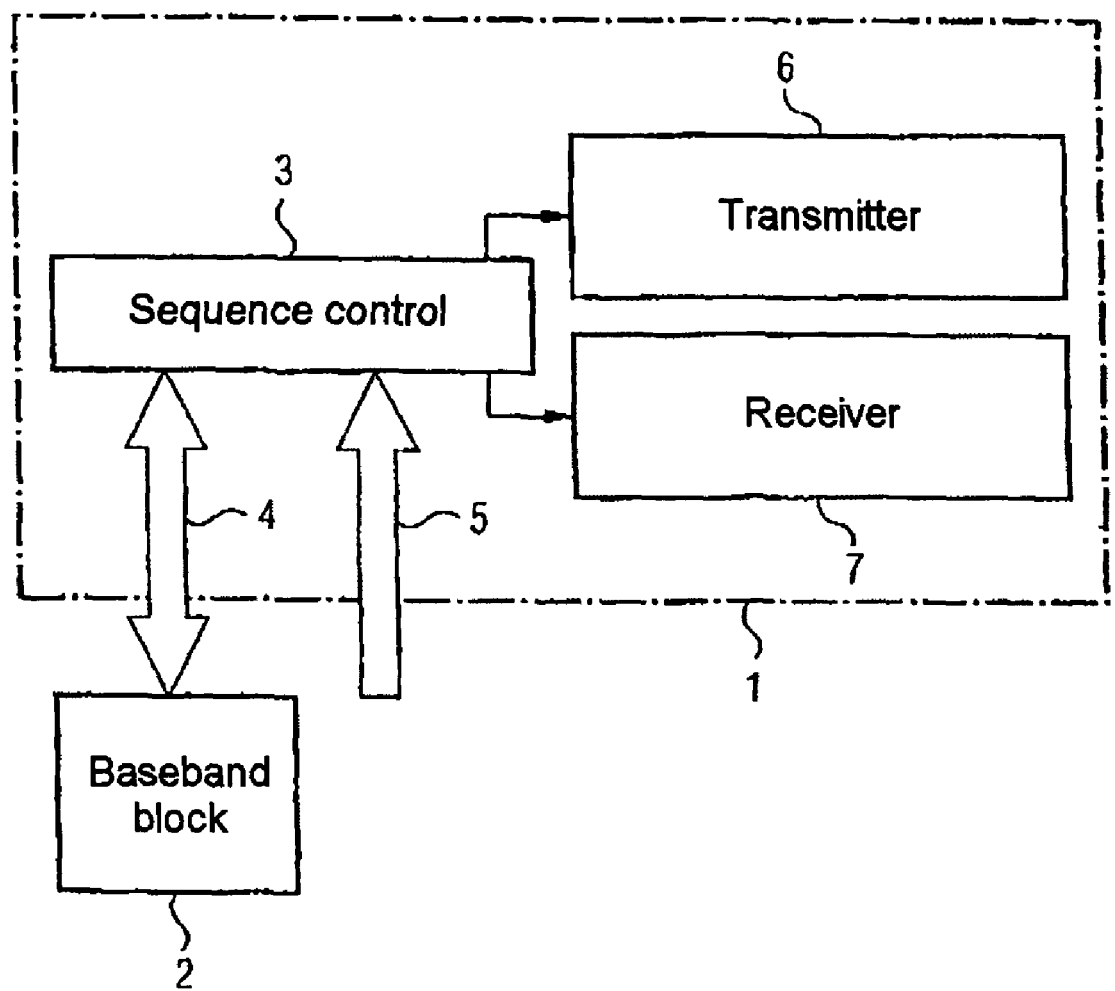
FIG. 1 diagrammatically shows the TDMA transceiver.

There is currently a multiplicity of different TDMA radio systems in existence (GSM, DECT, Bluetooth) and others are being planned. This fact makes it appear to be appropriate to use a universal radio module including a universal sequence control 3 and an RF section 6,7 as shown in FIG. 1 in the terminals of different systems.

As can be seen from FIG. 1, the TDMA transceiver includes an RF radio module 1 and a baseband block 2. The connection between baseband block 2 and RF radio module 1 is made via a purely digital interface 4. The RF radio module 1 is composed of a transmitter 6 and a receiver 7, the so-called RF section, which will not be considered in greater detail here, and a programmable sequence control 3 by which the particular specifications for the corresponding time slot structure for the respective TDMA radio system can be configured from the outside.

The burst mode controller 14 provides the structure of the respective time slot masks 10,11,13 of the TDMA radio system considered and, as a hardware-coded TDMA system-specific component, is an impediment on the path to implementing a universal radio module in the terminal.

A part of this burst mode controller 14 has now been moved, in the form of the sequence control 3, into the RF radio section 6,7 which is independent of the baseband controller 14. The configurable sequence control 3 thus becomes universal. As a result of the fact that it can be programmed or configured from the outside in accordance with the desired standard, it becomes possible to use it to configure the timing sequence parameters required by the respective time slot mask 10,11,13 of the TDMA radio system considered.

This requires a simple, purely digital interface 4 for triggering the sequence control 3, and a simple programming interface 5 to the outside for configuring or programming the sequence control 3 in accordance with the respective TDMA radio system.

Transmitter 6 and receiver 7, as the actual radio section, can be advantageously combined with the sequence control 3 to form one radio module 1. The aim of this is to integrate the sequence control 3 and the radio section 6,7 in one chip.

FIG. 2 again represents the TDMA transceiver. The universal RF radio module 1 contains a programmable sequence control 3 and overall is independent of the baseband block 2 which contains the baseband processor. The two units are connected via a digital interface 4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A Time Division Multiple Access (TDMA) transceiver comprising:

A Radio Frequency (RF) radio module including a receiver, a transmitter and a universal sequence controller; and a baseband block separate from and functionally independent of the radio module, wherein the baseband block and the radio module are connected via a first interface on the sequence controller and a burst mode controller of the baseband block provides a structure of respective timeslot masks, and the universal sequence controller of the radio module is provided with a second interface by which particular specifications for a corresponding structure of timeslot masks for a respective TDMA radio system is configurable from outside the baseband block in accordance with a desired standard.

2. The TDMA transceiver as claimed in claim 1, wherein the sequence control is independent of the baseband block.

3. The TDMA transceiver as claimed in claim 1, wherein the RF radio module and the sequence control are combinable to form one radio module.

4. The TDMA transceiver as claimed in claim 1, wherein the RF radio module and the sequence control are integrated in one chip.

5. A mobile radio device comprising a TDMA transceiver as claimed in claim 1.

6. A mobile radio device comprising a TDMA transceiver as claimed in claim 2.

7. A mobile radio device comprising a TDMA transceiver as claimed in claim 3.

8. A mobile radio device comprising a TDMA transceiver as claimed in claim 4.

9. The TDMA transceiver as claimed in claim 2, wherein the RF radio module and the sequence control are combined to form one radio module.

10. The TDMA transceiver as claimed in claim 2, wherein the RF radio module and the sequence control are integrated in one chip.

11. A mobile radio device comprising a TDMA transceiver as claimed in claim 9.

12. A mobile radio device comprising a TDMA transceiver as claimed in claim 10.

* * * * *

UNITED STATES PATENT AND TRADEMARK OFFICE
CERTIFICATE OF CORRECTION

PATENT NO. : 8,289,950 B2
APPLICATION NO. : 10/343489
DATED : October 16, 2012
INVENTOR(S) : Sydon et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1574 days.

Signed and Sealed this
Tenth Day of June, 2014

Michelle K. Lee
*Deputy Director of the United States Patent and Trademark Office*